United States Patent
Li et al.

(10) Patent No.: US 10,342,030 B2
(45) Date of Patent: Jul. 2, 2019

(54) NETWORK OPTIMIZATION METHOD FOR LARGE-SCALE MIMO NETWORK AND BASE STATION THEREOF

(71) Applicant: SHANGHAI RESEARCH CENTER FOR WIRELESS COMMUNICATIONS, Shanghai (CN)

(72) Inventors: Kai Li, Shanghai (CN); Hui-yue Yi, Shanghai (CN); Jiang Wang, Shanghai (CN); Yang Yang, Shanghai (CN); Hai-feng Wang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 31 days.

(21) Appl. No.: 15/669,971

(22) Filed: Aug. 7, 2017

(65) Prior Publication Data

US 2018/0288783 A1    Oct. 4, 2018

(30) Foreign Application Priority Data

Apr. 2, 2017   (CN) .......................... 2017 1 0216084

(51) Int. Cl.
*H04W 24/02*   (2009.01)
*H04W 72/08*   (2009.01)
*H04W 72/12*   (2009.01)

(52) U.S. Cl.
CPC ....... *H04W 72/1231* (2013.01); *H04W 24/02* (2013.01); *H04W 72/082* (2013.01); *H04W 72/121* (2013.01)

(58) Field of Classification Search
CPC ................................................. H04W 72/1231
(Continued)

(56) References Cited

U.S. PATENT DOCUMENTS

| 2014/0328327 A1* | 11/2014 | Xiao | H04W 36/30 |
| | | | 370/332 |
| 2015/0057005 A1* | 2/2015 | Sun | H04W 16/18 |
| | | | 455/446 |

(Continued)

OTHER PUBLICATIONS

Pastor-Perez Javier et al: "FFR-Aided Coordinated Multipoint Transmission in Downlink MIMO-OFDMA Networks", IEEE 82nd Vehicular Technology Conference (VTC2015-Fall), IEEE, Sep. 6, 2015 (Sep. 6, 2015), pp. 1-7, XP032857122, DOI: 10.1109/VTCFALL.2015.7390949 [retrieved on Jan. 25, 2016].

(Continued)

*Primary Examiner* — Brandon M Renner
*Assistant Examiner* — Abdeltif Ajid
(74) *Attorney, Agent, or Firm* — Soroker Agmon Nordman (57) ABSTRACT

The present invention discloses a network optimization method for a large-scale MIMO network and a base station thereof. The base station enables, according to a user minimum SINR threshold of each user in a preset cell, instantaneous spectral efficiency of the cell at a specific moment to approximate or reach a maximum value. In the present invention, a newly added user minimum SINR threshold parameter is configured, and a characteristic of a concave function is used, so that average spectral efficiency and edge spectral efficiency of each cell are simply and effectively controlled, so as to achieve an objective of coordination adjustment of network capacity and network coverage.

6 Claims, 3 Drawing Sheets

(58) Field of Classification Search
USPC .......................................................... 370/252
See application file for complete search history.

(56) References Cited

U.S. PATENT DOCUMENTS

2017/0244513 A1* 8/2017 Pitakdumrongkija ......................
                                                        H04B 7/0452
2018/0227927 A1* 8/2018 Sun ..................... H04W 72/085

OTHER PUBLICATIONS

Zhikun Xu et al: "Throughput and Optimal Threshold for FFR Schemes in OFDMA Cellular Networks", IEEE Transactions on Wireless Communications, IEEE Service Center, Piscataway, NJ, US, vol. 11, No. 8, Aug. 1, 2012 (Aug. 1, 2012), pp. 2776-2785, XP011457450, ISSN: 1536-1276, DOI: 10.1109/TWC.2012.061912. 110655.

Triki Imen et al: "Context-aware mobility resource allocation for QoE-driven streaming services", 2016 IEEE Wireless Communications and Networking Conference, IEEE, Apr. 3, 2016 (Apr. 3, 2016), pp. 1-6, XP032959534, DOI: 10.1109/WCNC.2016.7565146 [retrieved on Sep. 12, 2016].

* cited by examiner

NETWORK OPTIMIZATION METHOD FOR LARGE-SCALE MIMO NETWORK AND BASE STATION THEREOF

BACKGROUND

Technical Field

The present invention relates to a network optimization method for a large-scale MIMO network, also relates to a base station supporting network optimization of a large-scale MIMO network, and belongs to the field of wireless telecommunications technologies.

Related Art

For optimization of a wireless network, two most important objectives are high system capacity and wide system coverage. High system capacity is used to maximize spectrum utilization to serve more users, and system capacity is usually measured by using cell-average spectral efficiency (referred to as cell-system spectral efficiency below) and cell-edge spectral efficiency. Wide system coverage is used to ensure that lowest performance for a served user can be above an acceptable threshold, and system coverage is usually measured by using indicators of 5% cell-edge throughput and 5% cell-edge spectral efficiency.

A large-scale antenna technology is introduced to a large-scale MIMO network, so that spatial freedom is increased and system capacity is greatly increased. However, a severer interference problem occurs as a result. Currently, in almost all interference suppression solutions for a large-scale MIMO network, various precoding methods and inter-cell coordination solutions are designed from the perspective of reducing an inter-cell interference level. This makes it very difficult for a network optimization person to conveniently adjust system capacity and system coverage in a coordination way.

Currently, a common scheduling algorithm includes a maximum capacity sum algorithm, a proportional fair algorithm, and a polling algorithm. In these algorithms, scheduling is basically performed to reach maximum expected capacity or minimum interference. However, in a condition of large-scale MIMO networking, an interference level is highly susceptible to a scheduling solution of a user. Even if various precoding and interference cancellation modes are used, cell-edge throughput still cannot be controlled precisely. Consequently, a coordination between network capacity and network coverage cannot be ensured.

SUMMARY

A primary technical problem to be resolved by the present invention is to provide a network optimization method for a large-scale MIMO network.

Another technical problem to be resolved by the present invention is to provide a base station supporting optimization of a large-scale MIMO network.

To achieve the foregoing inventive objectives, the following technical solutions are adopted in the present invention:

According to a first aspect of embodiments of the present invention, a network optimization method for a large-scale MIMO network is provided, comprising the following step:

a base station in the network have a cell-system spectral efficiency of a preset cell at a specific moment to approximate or reach a maximum value, according to a user minimum SINR threshold of each user in the preset cell.

Preferably, the cell-system spectral efficiency is a concave function of the user minimum SINR threshold and a quantity of scheduled users.

Preferably, when the cell-system spectral efficiency at the specific moment reaches the maximum value, cell-system spectral efficiency and the cell-edge spectral efficiency reach a performance coordination point.

Preferably, the base station selects a specific user, and estimates a SINR estimate of the specific user according to the user minimum SINR threshold; and if the SINR estimate of the specific user is greater than or equal to the user minimum SINR threshold, the base station adds the specific user to a planned-to-be-scheduled-user set.

Preferably, the base station calculates the SINR estimate of the specific user based on a channel matrix of planned-to-be-scheduled users in the planned-to-be-scheduled-user set and the specific user.

Preferably, the SINR estimate of the specific user is calculated according to the following formula:

$$SINR = \frac{T/(N+I)}{Tr(PP^H)},$$

wherein T is a total transmitting power of the base station, N is a noise power, P is second-stage precoding, I is inter-cell interference and intra-cell interference, and a rank of $PP^H$ is a quantity K of scheduled users.

Preferably, the base station selects a user whose downlink average SINR value is less than the user minimum SINR threshold, as a cell-edge user, to perform interference coordination.

According to a second aspect of embodiments of the present invention, a base station supporting optimization of a large-scale MIMO network is provided, where the base station have a cell-system spectral efficiency of a preset cell at a specific moment to approximate or reach a maximum value, according to a user minimum SINR threshold of each user in the preset cell.

Preferably, when the cell-system spectral efficiency at the specific moment reaches the maximum value, cell-system spectral efficiency and the cell-edge spectral efficiency reach a performance coordination point.

Preferably, the base station selects a specific user, and estimates a SINR estimate of the specific user according to the user minimum SINR threshold; and if the SINR estimate of the specific user is greater than or equal to the user minimum SINR threshold, the base station adds the specific user to a planned-to-be-scheduled-user set.

Preferably, the base station calculates the SINR estimate of the specific user based on a channel matrix of planned-to-be-scheduled users in the planned-to-be-scheduled-user set and the specific user and a precoding method.

Preferably, the SINR estimate of the specific user is calculated according to the following formula:

$$SINR = \frac{T/(N+I)}{Tr(PP^H)},$$

wherein T is a total transmitting power of the base station, N is a noise power, P is second-stage precoding, I is inter-cell interference and intra-cell interference, and a rank of $PP^H$ is a quantity K of scheduled users.

According to a third aspect of embodiments of the present invention, a scheduling method for a large-scale MIMO network is provided, including the following step:

a base station in the network have a cell-system spectral efficiency of a preset cell at a specific moment to approximate or reach a maximum value, according to a user minimum SINR threshold of each user in the preset cell.

Compared with the prior art, in the present invention, a newly added user minimum SINR threshold parameter is configured, and a characteristic of a concave function is used, so that average spectral efficiency and edge spectral efficiency of each cell can be simply and effectively controlled, so as to achieve an objective of coordination adjustment of network capacity and network coverage.

DETAILED DESCRIPTION

Technical content of the present invention is described below in detail with reference to the accompanying drawings and specific embodiments.

The present invention first provides a network optimization method for performing coordination of cell capacity and cell coverage in a large-scale MIMO network. A parameter, a user minimum SINR, is newly configured to effectively control average spectral efficiency and edge spectral efficiency of each cell, so as to achieve an objective of coordinating a network capacity and a network coverage.

A network optimization method provided in the present invention is described below by taking a scenario of application in the LTE large-scale MIMO networking as an example. With a hypothesis that a scheduled users quantity K and an instantaneous signal-to-interference-plus-noise ratio ρ of a user are both continuous positive real numbers, and a scheduling constraint may be used to ensure that a rank of $PP^H$ is K, within a given time t, cell-system spectral efficiency E(t) meets the following relationship:

$E(\rho, K) = K \log 2(1+\rho)$ $st \cdot K \geq = 1, \rho > 0$ \hfill (1).

Figure 1:
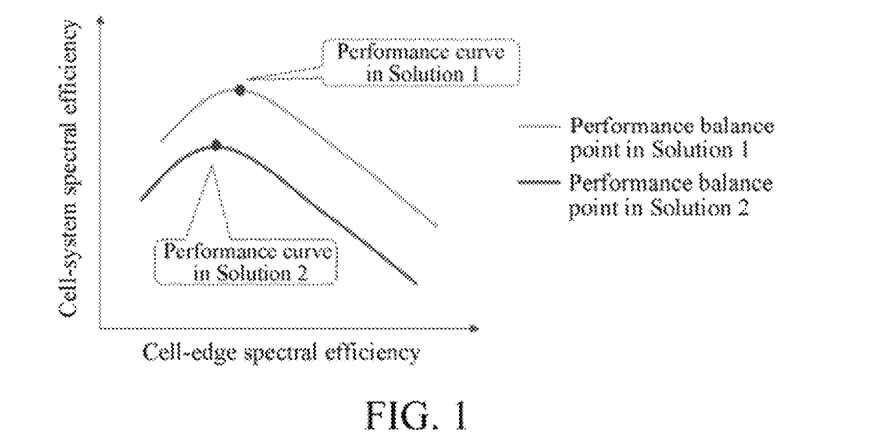
FIG. 1 is a schematic diagram of performance curves and performance coordination points of a system in different technical solutions.

It can be seen that E(t) is an increasing function of K, and increases linearly as K increases. E(t) is a decreasing function of ρ, and logarithmically decreases as ρ increases. A Hessian matrix of E(t) is negative definite. Therefore, E(t) is a concave function of ρ, K, and has a unique maximum value (a performance coordination point, a peak of a curve shown in FIG. 1):

$$H(E) = \begin{pmatrix} \frac{K}{(1+\rho)^2 \ln 2} & \frac{1}{(1+\rho)\ln 2} \\ \frac{1}{(1+\rho)\ln 2} & 0 \end{pmatrix}. \quad (2)$$

Therefore, a concave function shown in FIG. 1 shows a relationship between cell-system spectral efficiency and cell-edge spectral efficiency. When one of the the cell-system spectral efficiency and the cell-edge spectral efficiency is increased, the other correspondingly changes. During an adjustment of the cell-system spectral efficiency and the cell-edge spectral efficiency, a performance coordination point usually exists. That is, when one of the cell-system spectral efficiency and the cell-edge spectral efficiency is increased to a specific level, the other decreases consequently. This turning point is the so-called coordination point, that is, the peak of the curve in FIG. 1.

When the performance coordination point is reached, the cell spectral efficiency and the cell capacity become comprehensively optimal. Except for the performance coordination point, when one indicator (for example, the cell spectral efficiency) increases, the other indicator (for example, the cell capacity) decreases. Therefore, during optimization of a wireless network, the network performance is desirably adjusted to be near the performance coordination point of the performance curve shown in FIG. 1.

However, in a real scenario of network operation and maintenance, network capacity requires to be reduced to some degree to increase network coverage, or the network coverage requires to be reduced to some degree to increase the network capacity. For example, in a scenario in which a user complains about poor coverage or user experience of a VIP user needs to be ensured, a network optimization person may intend to increase the network capacity and reduce the network coverage performance or to reduce the network coverage performance to increase the network capacity. In this case, an objective of the network optimization is not to reach the performance coordination point, but instead, is to be near the performance coordination point depending on an indicator to be ensured. For example, the network optimization prefers increasing the network capacity to reducing the network coverage. That is, it is acceptable to improve the cell-edge spectral efficiency at the cost of reducing the cell-system spectral efficiency to some degree. In this case, the objective of the network optimization should be at the right side of the performance coordination point of the performance curve shown in FIG. 1, which is closer to the performance coordination point (however, it is not right at the performance coordination point).

As shown in FIG. 1, in a condition of a specific scheduling solution and parameter configuration, the cell-system spectral efficiency or the cell-edge spectral efficiency may be both increased. In a same configuration condition, solution 1 is better than solution 2, because performance indicators of the performance coordination point in solution 1 are better than those in solution 2.

The foregoing solution 1 and solution 2 are implemented by different user minimum SINR threshold parameters. However, this solutions adjustment effect are based on the premise of very low interference between cells. If adjustment of parameter of one cell results in great change in performance of another cell adjacent to the one cell, coordinating adjustment of the network indicators cannot be achieved. Therefore, an adjustment solution for the parameter configuration needs to be performed on the basis of an interference cancellation and scheduling solution.

In the network optimization method provided in the present invention, a network optimization parameter, that is, a "user minimum SINR threshold", is redefined. The network optimization parameter is used to adjust the cell-system average spectral efficiency and the cell-edge spectral efficiency. The network optimization parameter is transmitted from a base station to a UE via an air interface. The base station obtains a user minimum SINR threshold of each user in a preset cell, and then schedules the users according to the user minimum SINR threshold, to have the cell-system spectral efficiency or the cell-edge spectral efficiency of the cell to reach the performance coordination point or approximate the performance coordination point (in the foregoing case in which an indicator is increased at the cost of the other indicator, it is desired to approximate the performance coordination point).

Specifically, after obtaining a preset user minimum SINR threshold parameter, the base station selects a specific user (new user), and finds a SINR estimate of the specific user. The base station then compares the SINR estimate of the specific user with the user minimum SINR threshold. If the SINR estimate of the specific user is greater than or equal to the user minimum SINR threshold, the base station adds the specific user to a planned-to-be-scheduled-user set, and then selects another new user to perform scheduling, until user scheduling is completed. If the SINR estimate of the specific user is less than the user minimum SINR threshold, the base station deletes the specific user, and subsequently selects another new user.

In an embodiment of the present invention, the following two scheduling sets are included: (1) a to-be-scheduled-user set: a set of candidate users that meet basic scheduling requirements, a user in the set may be determined as a new user whether to be actually scheduled with a scheduling algorithm of the present invention; and (2) a planned-to-be-scheduled-user set: a set of users that are determined to be scheduled, that is, a set of users that meet all scheduling requirements and are to be actually scheduled. A new user is selected from the to-be-scheduled-user set as a to-be-scheduled specific user. If it is determined that the to-be-scheduled specific user is greater than or equal to the user minimum SINR threshold, in addition with meeting channel correlation principle, the to-be-scheduled specific user is added to the planned-to-be-scheduled-user set. Otherwise, the to-be-scheduled specific user is directly deleted and not to be scheduled.

In the network optimization method provided in the present invention, a base station adjusts a parameter (a user minimum SINR threshold of each user in a preset cell) to have the cell-system spectral efficiency at a specific moment to approximate or reach the maximum value through Step A to step C. Step C may be omitted or replaced with another conventional method.

Step A: Calculate a SINR estimate of a new user.

Generally, a two-stage precoding method is used in large-scale MIMO downlink transmission:

$$y = H^H BPd + z \quad (3)$$

where y is a received signal, d is a transmitting data symbol vector, and z represents Gaussian noise at a receiver of UE. B is first-stage precoding, and P is second-stage precoding. Users generally transmit with equal powers, so that normalization may be performed to obtain:

$$\tilde{y} = \sqrt{\frac{T/N}{Tr(BPP^H B^H)}} H^H BPx + n \quad (4)$$

where T is a total transmit power of the base station, and N is a noise power, x is a normalized signal, and n is normalized Gaussian noise. $H^H$ is conjugate transpose of a channel matrix, and $(\cdot)^H$ represents calculation of conjugate transpose.

Generally, the first-stage precoding is mostly pre-beamforming, and a unitary matrix structure is usually used for B. In this case, thus further simplification may be performed to obtain:

$$\tilde{y} = \sqrt{\frac{T/N}{Tr(PP^H)}} H^H BPx + n. \quad (5)$$

After a zero-forcing solution is determined through second-stage precoding, an SNR of each user may be directly calculated:

$$SNR = \frac{T/N}{Tr(PP^H)}. \quad (6)$$

Different SNR calculation formulas may be obtained by using different second-stage precoding methods. If interference is taken into consideration, estimation of an interference level may be added into the formula to attain a user SINR estimate:

$$SINR = \frac{T/(N+I)}{Tr(PP^H)}. \quad (7)$$

In a case of large-scale MIMO networking with a MU MIMO transmission mode, a quantity of transmitting antennas of base stations is far greater than a total quantity of receiving antennas of scheduled users. Inter-cell interference or intra-cell interference may be desirably canceled by using distributed zero-forcing or block-diagonal zero-forcing. Therefore, interference I meets I→0. The user SINR estimate may be attained through formula (6) without estimating a value of interference I.

Therefore, in scheduling, a SINR of each user can be estimated more accurately since the SINR could be calculated according to a scheduled users channel matrix, and a user minimum SINR value may be controlled since the user SINR estimate is required to be greater than or equal to a target SINR threshold, an objective of coordinating the cell-edge spectral efficiency and the cell-system spectral efficiency is thus achieved.

An overall increasing trend of the target SINR threshold is determined by performance curves of different solutions. Generally speaking, as the target SINR threshold increases, the cell-system spectral efficiency increases while the cell-edge spectral efficiency goes up before the performance coordination point, and cell-system spectral efficiency turns to decrease as the cell-edge spectral efficiency goes up after the performance coordination point.

If the interference I does not meet I→0, the accuracy of the SINR estimate depends on estimation accuracy of the interference I. In non-centralized scheduling, a statistical value for I is needed, and its precision depends on the statistical solution.

In a conventional scheduling solution, the user minimum SINR is considered as a constraint as an inner parameter, rather than an external configuration parameter. Therefore, the parameter is not a system-level configuration parameter.

Step B: Perform scheduling according to a user minimum SINR threshold.

Figure 2:
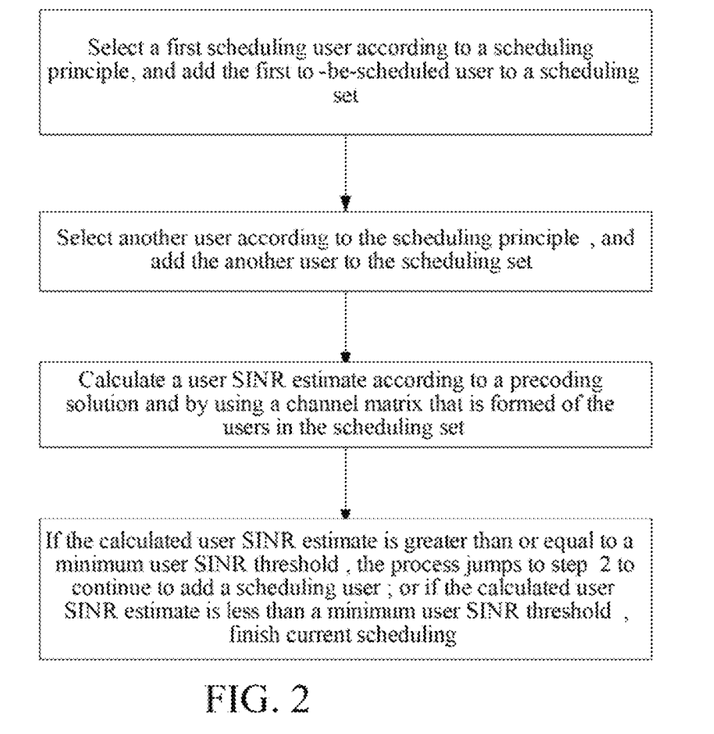
FIG. 2 is a schematic flowchart of performing scheduling based on a user minimum SINR in the present invention.

As shown in FIG. 2, a method for performing scheduling according to a user minimum SINR threshold in the present invention includes the following steps.

Step 1: Traverse all users and select the first to-be-scheduled user from a to-be-scheduled-user set according to a scheduling principle. For example, in a PF scheduling algorithm, a user having maximum proportional fair r/R is selected as the first to-be-scheduled user (new user).

Step 2: Select another to-be-scheduled user (specific user) from the to-be-scheduled-user set according to the scheduling principle. For example, selecting another to-be-scheduled user according to a ratio of a maximum singular value to a minimum singular value of a multiuser channel matrix $H^H H$ includes the following steps: selecting a specific user from the to-be-scheduled-user set, constructing a multiuser channel matrix H of the specific user and all users in the planned-to-be-scheduled-user set, and performing singular value decomposition on $H^H H$, to obtain a maximum eigenvalue $\lambda_{max}$ and a minimum eigenvalue $\lambda_{min}$.

If a center user and an edge user are scheduled at the same time, the throughput of the center user is reduced because of the edge user. To increase a spatial multiplexing rate without reducing capacity, it should be ensured that a difference between $\max(\lambda_k)$ and $\min(\lambda_k)$ is within a specific range during scheduling. This range is defined as a user-scheduling search radius ($\lambda$max/$\lambda$min). The base station determines whether the user-scheduling search radius is greater than a preset user-scheduling search radius threshold value. If the user-scheduling search radius is greater than the set user-scheduling search radius threshold value, the base station deletes the specific user from the to-be-scheduled-user set, and the process turns to step 2. If the user-scheduling search radius is not greater than the set user-scheduling search radius threshold value, the process turns to step 3.

It should be noted that multiple conventional manners may be used to determine whether to delete a specific user from the to-be-scheduled-user set. The present invention is not limited to the foregoing method of a search radius. Details are not described herein.

Step 3: Calculate a user SINR estimate according to a precoding method and by using the multiusers channel matrix of the to-be-scheduled users (specific users) selected from the to-be-scheduled-user set.

According to the foregoing formula (6) or formula (7), the base station calculates the user SINR estimate based on a multiusers channel matrix of planned-to-be-scheduled users in the planned-to-be-scheduled-user set and the specific user, according to a precoding method.

Step 4: If the user SINR estimate of the specific user is greater than or equal to the preset user minimum SINR threshold, the specific user is then added to the planned-to-be-scheduled-user set, and then the process turns to step 2 to select a next to-be-scheduled user.

If the user SINR estimate of the specific user selected from the to-be-scheduled-user set is less than the preset user minimum SINR threshold, delete the corresponding specific user, and the process turns to step 2 till the scheduling is completed.

A method for setting a default value of a user minimum SINR threshold parameter is: to simulate in a typical transmission scenario (for example, a typical coverage scenario such as a dense urban area scenario and a rural scenario) and a service model, and to obtain a performance coordination point as the default value of the SINR threshold parameter.

Step C: Select an edge user by using the user minimum SINR threshold to perform interference coordination.

Figure 3:
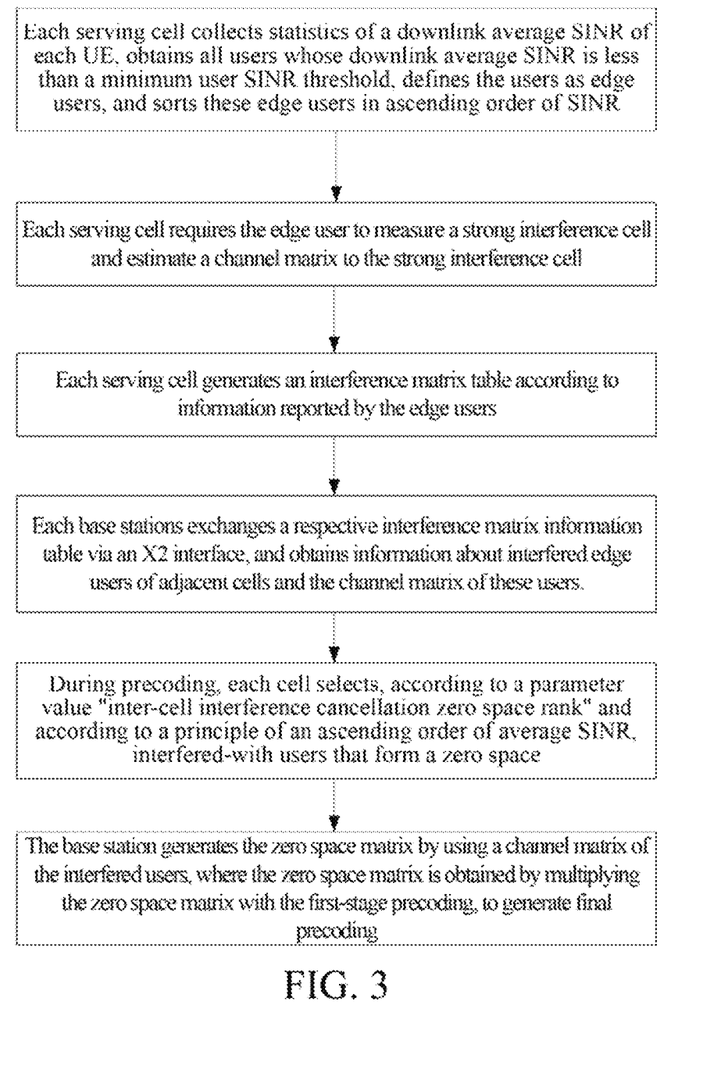
FIG. 3 is a schematic flowchart of an interference coordination mechanism based on a user minimum SINR in the present invention.

An interference coordination mechanism based on a user minimum SINR threshold is implemented with cooperation of a measurement module and a precoding module in the base station as below.

Step C1: The base station acquires statistics of downlink average SINR of each UE in the cell, defines all users whose downlink average SINR is less than the user minimum SINR threshold as edge users, and sorts these edge users in ascending order of SINR value.

Step C2: The base station requires the edge user to measure strong interference cell, and estimate a channel matrix of the edge user to the strong interference cell.

Step C3: The base station compiles the following interference matrix information table according to information reported by the edge users.

| Serving cell-edge user ID | Average SINR (dB) | Adjacent cell ID | Adjacent cell channel matrix |
| --- | --- | --- | --- |
| CELL1-UE1 | −3 dB | CELL-2 | H_c1u1_c2 |
| CELL1-UE2 | −1 dB | CELL-3 | H_c1u2_c3 |
| ... | ... | ... | ... |

Step C4: Each base stations exchanges a respective interference matrix information table via an X2 interface, and each cell obtains information about interfered edge users of adjacent cells and the channel matrix of these users.

Step C5: During precoding, the base station selects interfered users that form a zero space, according to a parameter value "inter-cell interference cancellation zero space rank" and an ascending order of the average SINR. The rank of the channel matrix of the selected interfered users and the value of the "inter-cell interference cancellation zero space rank" parameter are added up and the sum is less than or equal to a quantity of transmitting antennas of the base station.

Specifically, in precoding, a parameter "adjacent cell-edge user interference suppression percentage" a is defined as a percentage of users need interference suppression. When a is 100%, the interference suppression needs to be performed for all edge users. Each serving cell selects, according to an ascending order of average SINR, the interfered users that form the zero space, counts a quantity e of the interfered users of each adjacent cell, multiplies the quantity e by $\alpha$, and selects channels of first $\alpha$*e users of the adjacent cells to perform interference suppression.

Step C6: The base station generates the zero space matrix by using a channel matrix of the interfered users, so as to generate eventual precoding by multiplying the zero space matrix with the first-stage precoding.

To reduce influence of inter-cell interference, the "inter-cell interference cancellation zero space rank" needs to be reduced. In this case, interference between users in a cell increases correspondingly. The parameter "inter-cell interference cancellation zero space rank" is used to adjust a spatial freedom resource for inter-cell interference cancellation and intra-cell interference cancellation.

In the foregoing interference coordination method, the cell-edge user are selected according to the user minimum SINR threshold, and interference coordination is then implemented based on information reported by these edge users with various conventional algorithms (which are not limited to the foregoing method).

A technical effect of the network optimization method is described below in detail. By means of the present network optimization method, coordination adjustment of the cell-system average spectral efficiency and the cell-edge spectral efficiency in the large-scale MIMO network may be implemented by configuring the user minimum SINR threshold parameter. Configuration of a corresponding simulation system is shown in the following table:

| Parameter | Value |
| --- | --- |
| Networking mode | Three intra-frequency sectors (3-layer cell), 19 base stations, 57 cells, and 15 users in each cell |
| Quantity of antennas of the base station | 64 |
| Antenna polarization mode of the base station | Dual polarization |
| Arrangement mode of the antenna array of the base station | Planar array, 16 (8) antennas in each row, 4 (8) antennas in each column, and vertically arranged antenna elements |
| Quantity of antennas of the UE | 2 |
| Antenna polarization mode of the UE | Dual polarization |
| Arrangement mode of the antenna array of the UE | Linear array, 2 antennas in a row, vertically arranged antenna elements, and a distance of 0.5 wavelength between antenna elements |
| Antenna gain | Determined according to a scenario of 3GPP TR 36.873 3D-UMa |
| Distance between the base stations | 500 m |
| Antenna height of the base station | 25 m |
| Distribution and antenna height of terminals | Determined according to a scenario of 3GPP TR 36.873 3D-UMa |
| Channel model | 3D-UMa |
| Horizontal distance between antennas | 0.5 wavelength |
| Vertical distance between antennas | 0.8 wavelength |
| Moving speed of the UE | 3 km/h |
| Precoding algorithm for multiuser transmission | JSDM (Joint Spatial Division and Multiplexing) |
| Receiving algorithm of the UE | ZF |
| Ideal uplink channel estimate enable | Yes |
| Ideal downlink channel estimate enable | Yes |
| Transmit power of the base station | 46 dBm |
| Transmit power constraining manner | Total transmit power is consistent |
| Inter-cell interference coordination | When sending precoding, the base station multiplies the precoding by a zero space of a space spanned by a vector of a channel matrix that is formed by interfered users of adjacent cells, to implement interference cancellation |
| Scheduling method | PF, a user reuses full-spectrum bandwidth |
| Quantity of scheduling layers | Define a maximum quantity of scheduling layers. The quantity is an integer from 1 to 30. Depending on channel-matrix maximum-eigenvalue-to-minimum-eigenvalue ratio threshold. |
| Channel-matrix maximum-eigenvalue-to-minimum-eigenvalue ratio threshold | During scheduling of a user, a ratio of a maximum eigenvalue to a minimum eigenvalue is obtained by an effective channel matrix. A threshold of the value is 100. |
| Simulation bandwidth | 10M |
| Carrier frequency | 2 GHz |

Figure 4:
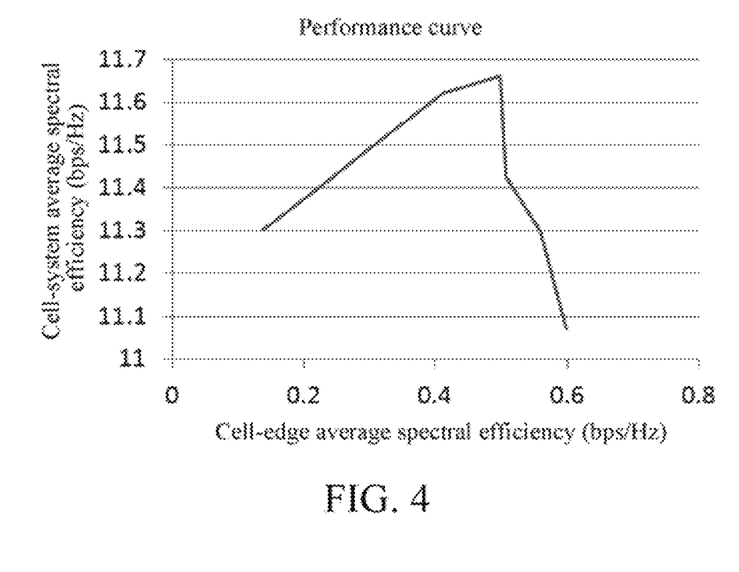
FIG. 4 is a simulation performance curve diagram of a scheduling method provided in the present invention.

Results obtained through simulation are shown in the following table, and corresponding performance curves are shown in FIG. 4.

| Test example No. | Minimum target SINR threshold (dB) | Cell average throughput (Kbps) | 5% cell-edge users average throughput (Kbps) | Cell average spectral efficiency (bps/Hz) | 5% cell-edge users spectral efficiency (bps/Hz) |
| --- | --- | --- | --- | --- | --- |
| 1 | NA | 113021.029 | 1372.484 | 11.3021 | 0.13725 |
| 1 | 4.7712 | 116225.642 | 4117.453 | 11.6226 | 0.41175 |
| 3 | 6.9897 | 116625.545 | 4984.197 | 11.6626 | 0.49842 |
| 4 | 8.4510 | 114287.509 | 5074.203 | 11.4288 | 0.50742 |

-continued

| Test example No. | Minimum target SINR threshold (dB) | Cell average throughput (Kbps) | 5% cell-edge users average throughput (Kbps) | Cell average spectral efficiency (bps/Hz) | 5% cell-edge users spectral efficiency (bps/Hz) |
|---|---|---|---|---|---|
| 5 | 9.5424 | 112992.513 | 5589.042 | 11.2993 | 0.55890 |
| 6 | 11.7609 | 110704.254 | 5984.060 | 11.0704 | 0.59841 |

As can be seen from the foregoing table and FIG. 4, different user minimum SINR thresholds are configured, so that cell-edge average spectral efficiency and cell-system average spectral efficiency can be effectively adjusted, to obtain performance curves close to those in FIG. 1. As can be seen from the foregoing table and FIG. 4, when the minimum target SINR threshold is configured to be 6,9897 dB, a coordination state of the system is reached.

In conclusion, during scheduling of the present invention, a user minimum SINR threshold parameter is newly added to set an expected target of a user minimum SINR, so as to achieve an objective of quantitatively controlling minimum throughput of users in a cell. Because a coordination point exists between the cell-system throughput and the cell-edge throughput, minimum throughput of users in the cell may be controlled to adjust overall performance of the cell. That is, an objective of adjusting the cell-system throughput and the cell-edge throughput could be implemented by adjusting an expected target of the user minimum SINR.

The present invention further provides a base station supporting optimization of a large-scale MIMO network, so as to implement the foregoing network optimization method for a large-scale MIMO network.

Specifically, according to the user minimum SINR threshold of each user in the preset cell, the base station have instantaneous spectral efficiency of a serving cell of the base station at a specific moment to approximate or reach a maximum value. When the instantaneous spectral efficiency of the cell at the specific moment reaches the maximum value, the cell-system throughput and the cell-edge throughput of the cell reach the performance coordination point.

The base station acquires the SINR estimate of the specific user according to the user minimum SINR threshold, and adds to a to-be-scheduled-user set, the user whose SINR estimate is greater than the user minimum SINR threshold. According to formula (7), the base station calculates the SINR estimate of the specific user based on a channel matrix of the scheduled users in the to-be-scheduled-user set and the precoding method.

The network optimization method for a large-scale MIMO network and the base station thereof provided in the present invention are described above in detail. Any obvious change made by a person skilled in the art to the present invention without departing from the essence of the present invention shall infringe the patent right of the present invention and the person shall be subject to corresponding legal liabilities.

What is claimed is:

1. A network optimization method for a large-scale MIMO network, comprising the following step:

after obtaining a user minimum SINR threshold in a preset cell, a base station selects a specific user, and estimates a SINR estimate of the specific user; the SINR estimate of the specific user is calculated according to the following formula:

$$SINR = \frac{T/(N+I)}{Tr(PP^H)},$$

wherein T is a total transmitting power of the base station, N is a noise power, P is second-stage precoding, I is inter-cell interference and intra-cell interference, and a rank of $PP^H$ is a quantity K of scheduled users:

the base station schedules the users according to the user minimum SINR threshold, to have a cell-system spectral efficiency of the preset cell at a specific moment to approximate or reach a maximum value.

2. The network optimization method according to claim 1, wherein
the cell-system spectral efficiency is a concave function of the user minimum SINR threshold and a quantity of scheduled users.

3. The network optimization method according to claim 2, wherein
when the cell-system spectral efficiency at the specific moment reaches the maximum value, cell-system spectral efficiency and the cell-edge spectral efficiency reach a performance coordination point.

4. The network optimization method according to claim 1, wherein
if the SINR estimate of the specific user is greater than or equal to the user minimum SINR threshold, the base station adds the specific user to a planned-to-be-scheduled-user set.

5. The network optimization method according to claim 4, wherein
the base station calculates the SINR estimate of the specific user based on a channel matrix of planned-to-be-scheduled users in the planned-to-be-scheduled-user set and the specific user.

6. The network optimization method according to claim 1, wherein
the base station selects a user whose downlink average SINR value is less than the user minimum SINR threshold, as a cell-edge user, to perform interference coordination.

* * * * *